United States Patent
Kang et al.

(10) Patent No.: US 7,209,669 B2
(45) Date of Patent: Apr. 24, 2007

(54) METHOD AND APPARATUS FOR SYNCHRONIZING A PULSE CARVER AND A DATA MODULATOR FOR OPTICAL TELECOMMUNICATION

(75) Inventors: Inuk Kang, Matawan, NJ (US); Linn Frederick Mollenauer, Colts Neck, NJ (US)

(73) Assignee: Lucent Technologies Inc., Murray Hill, NJ (US)

( * ) Notice: Subject to any disclaimer, the term of this patent is extended or adjusted under 35 U.S.C. 154(b) by 680 days.

(21) Appl. No.: 10/354,718

(22) Filed: Jan. 30, 2003

(65) Prior Publication Data

US 2003/0147114 A1    Aug. 7, 2003

Related U.S. Application Data

(60) Provisional application No. 60/353,628, filed on Feb. 1, 2002.

(51) Int. Cl.
*H04B 10/04* (2006.01)

(52) U.S. Cl. .................. 398/195; 398/198; 398/196

(58) Field of Classification Search .............. 398/198, 398/195; 372/30
See application file for complete search history.

(56) References Cited

U.S. PATENT DOCUMENTS

| | | | | |
|---|---|---|---|---|
| 5,068,864 A | * | 11/1991 | Javan | 372/32 |
| 5,274,659 A | * | 12/1993 | Harvey et al. | 372/94 |
| 5,524,076 A | * | 6/1996 | Rolland et al. | 385/8 |
| 6,671,079 B2 | * | 12/2003 | Fuller et al. | 359/264 |
| 6,766,116 B2 | * | 7/2004 | Webb | 398/196 |
| 7,079,772 B2 | * | 7/2006 | Graves et al. | 398/95 |
| 2002/0001115 A1 | * | 1/2002 | Ishida et al. | 359/180 |
| 2002/0044322 A1 | * | 4/2002 | Blumenthal et al. | 359/161 |
| 2002/0071184 A1 | * | 6/2002 | Nishi et al. | 359/578 |
| 2005/0135439 A1 | * | 6/2005 | Chapman et al. | 372/20 |
| 2005/0271393 A1 | * | 12/2005 | Gnauck et al. | 398/186 |

* cited by examiner

*Primary Examiner*—Dalzid Singh

(57) ABSTRACT

Method and apparatus for synchronizing two different types of modulators in an optical transmission system includes a first modulator generating an optical pulse train, a second modulator encoding data onto the optical pulse train, an optical filter resolving upper and lower modulation sidebands of the optical data and an analyzer measuring the optical power of modulation sidebands and converting the received optical power of the sidebands into a control signal for synchronizing the two modulators. A wedged etalon is the filter element selecting the USB and LSB from the optical data spectrum. The analyzer contains photo-detectors measuring the optical power of the filtered USB and LSB and an electronic differential amplifier producing a control signal based upon photo-detector output. The phase shifter, in response to the control signal, adapts the temporal delay of the first modulator to reduce differences between the power levels of the upper and lower sidebands.

29 Claims, 7 Drawing Sheets

METHOD AND APPARATUS FOR SYNCHRONIZING A PULSE CARVER AND A DATA MODULATOR FOR OPTICAL TELECOMMUNICATION

CROSS-REFERENCE TO RELATED APPLICATIONS

This application claims benefit of U.S. provisional patent application Ser. No. 60/353,628, filed Feb. 1, 2002, which is herein incorporated by reference.

FIELD OF INVENTION

This invention generally relates to optical data transmission systems. More specifically, the invention relates to improvements in synchronizing the operation of an optical pulse carver and an electroabsorption data modulator in an optical transmitter for long-haul (LH) and ultralong-haul (ULH) transmission.

BACKGROUND OF INVENTION

High bit-rate (LH and/ULH) dense wavelength-division-multiplexing (DWDM) transmission systems require reliable, compact, and economical transmitters. FIG. 1 depicts a typical transmitter 100 for ON-OFF-keying, Return-to-Zero (RZ) transmission and consists of a semiconductor distributed-feedback (DFB) laser 102 followed by a pulse carver modulator (PCM) 104 and an electroabsorption data modulator (EAM) 106. The order of the EAM and PCM is reversible. The PCM is driven by an electronic clock 108 running at the line rate of the system (10 GHz, for example) and produces a train of RZ pulses from the DFB laser output to act as a carrier for data. A phase shifter 112 is also typically placed between the clock 108 and the PCM 104 to initialize transmitter timing. An electronic data pulse stream to be transmitted (consisting of, for example, a series of square electric pulses representing 1's and 0's of binary data D from data module 110) modulates the optical transmission of the EAM, and the data is encoded into an optical pulse train. The final output of the two modulators is an optically modulated data pulse train.

Two problems associated with such transmitters are maintaining the stringent requirements of the output wavelength and power stability and maintaining the correct timing between the two modulators for the pulse carving and data modulation. Temperature fluctuation in the field and the aging of the electronic devices cause the RF group delays of the drive circuits of the modulators to drift, resulting in timing misalignment. This timing misalignment increases the penalties in the data transmission and needs to be addressed for optimal performance of the optical communication systems. For example, one aspect of the penalties that may arise in system 100 is seen by inspection of the graphs shown in FIGS. 2A–2D. FIG. 2A depicts a case in which the optical pulse from the PCM enters the EAM too early and leads the data pulse. In such a circumstance, a positive chirp is introduced into the data (a change in frequency $\Delta\omega$ and as seen by the dotted line above the data and timing curves in FIG. 2A). The spectral analysis of the timing conditions of FIG. 2A is shown in FIG. 2B wherein a center frequency (CF) is flanked by asymmetrical lower sideband (LSB) and upper sideband (USB). The reverse conditions (wherein the optical pulse lags behind the data pulse is seen in FIG. 2C. In this condition, spectral analysis (as shown in FIG. 2D) reveals that the asymmetry of the upper and lower sidebands still exists, but is reversed from the previous condition. In an optimal and desired condition, the data pulse and the pulsed optical output of the PCM share a common center point with respect to time (denoted by (x) in FIGS. 2A and C). In such a condition, chirp is minimized and the spectral analysis reveals symmetrical upper and lower sideband modulation levels. The timing drift in real devices tends to be random and thus the optical data will suffer from random chirping without an active management of the timing between the PCM and EAM.

Therefore, it is desired to have an apparatus for LH and ULH DWDM transmission that is capable of synchronizing the pulse carver modulator and electroabsorption data modulator and a concomitant method for establishing such operational conditions.

SUMMARY OF THE INVENTION

The present invention provides an apparatus for the synchronization of a pulse carver modulator and electroabsorption data modulator used in an optical transmitter for optical telecommunication. It includes a first, pulse carver modulator to generate a RZ optical pulse train, a second, electroabsorption modulator to encode the data onto the optical pulse train, an optical filter to resolve upper and lower modulation sidebands of the RZ optical data, and an analyzer to measure the relative optical power of the two modulation side bands and convert the received optical power of the sidebands into a control signal for synchronizing the two modulators. The present invention also includes a voltage-controlled phase shifter to control the relative timing between the pulse carver modulator and electroabsorption modulator via the control signal and optical power splitters to tap a portion of the optical data into at least two portions.

In one embodiment of the invention, a semiconductor DFB laser is used and a Lithium Niobate amplitude modulator is used for pulse carving. A wedged etalon is used as a filter element to select the USB and LSB from the spectrum of the optical data. The filter is slightly wedged such that the thickness varies linearly along its cross-section and the transmission frequency changes accordingly. The analyzer contains two substantially identical photo-detectors to measure the optical power of the filtered USB and LSB. An electronic differential amplifier takes the signal from the two photo-detectors and produces a control signal proportional to the difference of the powers of USB and LSB. The phase shifter, in response to said control signal, adapts the temporal delay of the electronic drive of the pulse carver modulator in a manner that reduces differences between the relative power levels of said upper and lower sidebands.

The invention also includes a method for synchronizing pulses from an optical carver and a data modulator that has steps of providing a data bearing optical signal in response to a sequence of optical signal carrier pulses and data pulses, determining at least a relative signal strength of upper and lower modulation sidebands associated with the data bearing optical signal and in response to the determined relative signal strength, adapting the sequence of optical signal carrier pulses in a manner tending to reduce differences between the signal strength of the upper and lower modulation sidebands. In one embodiment, the determining step includes splitting the data bearing optical signal into a plurality of optical signal portions, passing at least two of the optical signal portions through a filter element to produce filtered optical signal portions having respective center frequencies offset from an initial center frequency of a predetermined amount and detecting a power level of each of the at least two filtered optical signal portions. The adapting step includes applying a control signal to a shifting device for adjusting an optical signal carrier pulse rate, the control signal being indicative of the differences in signal strength between the lower and upper modulation sidebands.

BRIEF DESCRIPTION OF THE DRAWINGS

The teachings of the present invention can be readily understood by considering the following detailed description in conjunction with the accompanying drawings, in which.

To facilitate understanding, identical reference numerals have been used, where possible, to designate identical elements that are common to the figures.

DETAILED DESCRIPTION OF THE INVENTION

Figure 3:
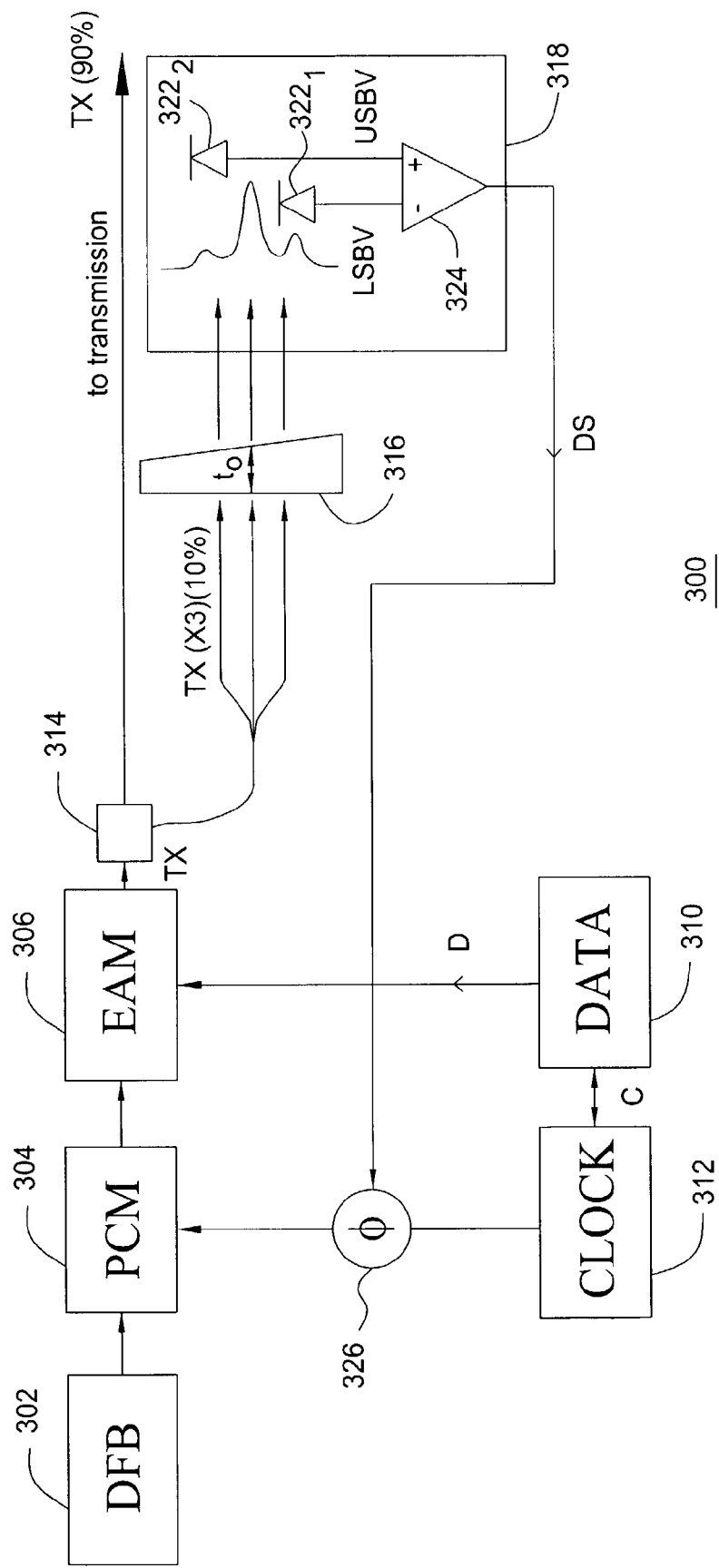
FIG. 3 depicts an optical transmitter in accordance with the subject invention.

FIG. 3 depicts a system 300 for ultralong-haul dense wavelength division multiplexing (DWDM) transmission of data in an optical environment. The system 300 contains a semiconductor distributed feedback laser (DFB) 302 and a pulse carver modulator (PCM) 304. In a preferred embodiment, the PCM 304 is a Lithium-Niobate PCM. The optical carrier frequency of the DFB laser is typically a multiple of 50 GHz as set by the industry standard. The PCM 304 is driven by an electronic clock 312 running at the line rate of the communication network and produces a train of Return-to-Zero (RZ) optical carrier pulses from the DFB laser output. An electronic data pulse stream to be transmitted (consisting of, for example, a series of square electric pulses representing 1's and 0's of binary data D from data module 310) modulates optical transmissions from an electroabsorption modulator (EAM) 306, and results in the data being encoded into an optical pulse train (TX). The data module 310 and electronic clock 312 are connected such that the data rate (10 Gbits/s, for example ) is identical to the repetition rate (10 GHz, for example) of the optical pulse train produced by the PCM 304. A phase shifter 326 temporally shifts the clock signal to the PCM 304 and hence controls the timing between the pulse carving in the PCM 304 and data modulation in the EAM 306. Additionally, data module 310 communicates with the electronic clock 312 via control signals C. Likewise, the electronic clock 312 can send control signals to the data module 310, thereby allowing for additional communication. For those who are skilled in the art, it should be apparent that several different configurations of the transmitter are possible, where the present invention is still applicable. Examples of such modifications are, but not limited to, replacement of the semiconductor DFB laser by a semiconductor tunable laser, the Lithium-Niobate PCM by a low-chirp EAM pulse carver, or the combination of the DFB laser and the Lithium-Niobate PCM by any low-chirp pulsed laser source, such as a mode-locked fiber laser. Moreover, the order of the PCM 304 and EAM 306 is interchangeable. However, the EAM's 306 primary task is for data modulation and its operational characteristics are its polarization insensitivity and low drive voltage requirement. Examples of suitable components are JDS Uniphase QF935/208 for the DFB, Lucent X2623C for the PCM and Oki OM5642W-30B for the EAM.

Figure 4:
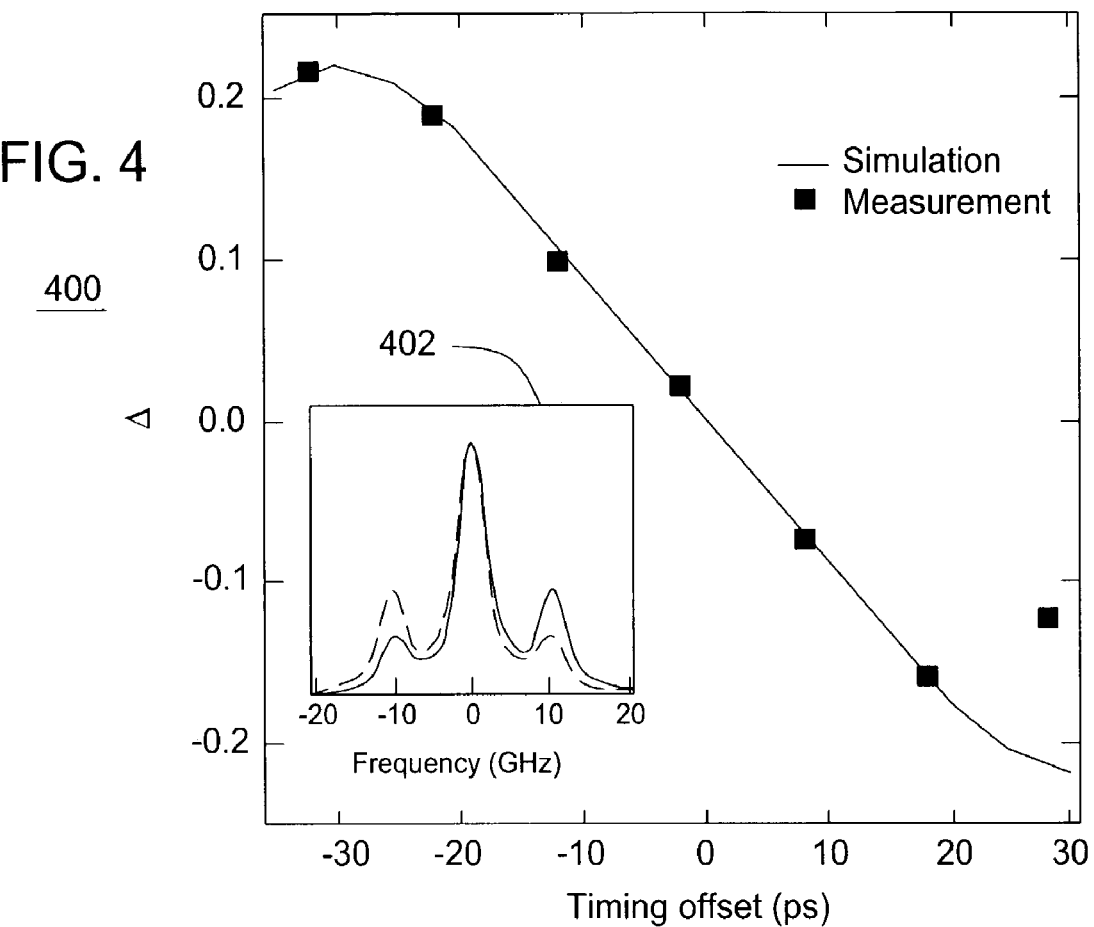
FIG. 4 depicts a graph of timing misalignment vs. power differences of the USB and LSB.

As discussed earlier, there is a direct correlation between the spectral asymmetry of the optical data pulses and the temporal misalignment between the PCM 304 and EAM 306. The pulse and data modulation rate is 10 Gbit/s. Specifically, FIG. 4 depicts a graph 400 of timing offset in picoseconds between the PCM 304 and EAM 306 versus the normalized power difference ($\Delta$) in the upper and lower modulation sidebands. More specifically, $\Delta$=((power in +10 GHz sideband)–(power in –10 GHz sideband ))/(power in the carrier). It is easily seen by inspection of graph 400 that as the timing offset increases from 0, the normalized power moves into a more negative regime (and the lower sideband is smaller in intensity than the upper sideband as denoted by the solid curve in the inset graph 402). Similarly, as the timing offset decreases from 0, the normalized power increases and a shift in the frequency spectrum occurs resulting in the lower sideband being greater in intensity than the upper sideband (as denoted by the dashed curve in the inset graph 402). More specifically, the inset in FIG. 4 depicts the optical spectra (shifted by the optical carrier frequency) of the output TX of the transmitter 300 in FIG. 3 in the case when the pulse carver leads (solid curve) or lags (dashed curve) the EAM 306 by 20 ps.

The measurement of the relative powers in the upper and lower sidebands requires a filter element 316 with a spectral resolution better than roughly a third of the modulation bandwitdth. The spectral measurement of the modulation sidebands is most easily implemented using a wedged etalon as depicted in FIG. 3. It has no moving parts unlike other filter elements, such as a scanning etalon. A small fraction (~10%) of the output signal (data-encoded optical pulse train) TX is connected to an optical splitter 314 to create a plurality of transmitted signals TX (e.g., three split signals TX). The split output signals TX are then passed through a wedged etalon filter 316.

Figure 5:
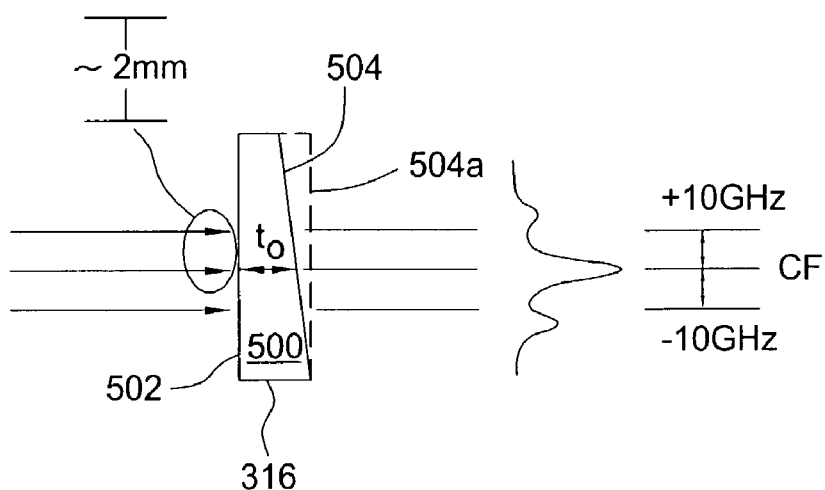
FIG. 5 is a detailed view of a filter element of the system of the subject invention.

The details of the wedged etalon filter 316 are depicted in FIG. 5. The filter element 316 (etalon) is a fused silica substrate block 500. The block consists of two planes, a first plane 502 and a second plane 504. The second plane 504 is angled with respect to first plane 502. In one example of the etalon, the angle of the second plane 504 with respect to the first plane 502 is approximately 10 arcsec. The angle is calculated such that the first order modulation sideband frequencies on either side of the center frequency can be viewed over a desired linear spacing shift along the direction of the first plane 502. In one example of the subject invention, the angle of the etalon is produced in such a manner so as to produce a 10 GHz transmission peak shift over approximately a 2 mm linear direction along first plane 502. The filter thickness varies linearly along its cross-section. The transmission spectrum of a wedged etalon filter is made up of a comb of periodic transmission peaks with the period of $\Delta f=c/2nt$, where c is the speed of light, n is the refractive index of the etalon material, and t is the filter thickness. Thus, different frequencies will be filtered depending on the local thickness at the location at which the light impinges. For example, only the upper side band is transmitted from a top port of the optical splitter 314 while the lower side band is filtered from a bottom port of the optical splitter 314. The wedged etalon filter 316 is made of fused silica and designed with the thickness $t_o$~2 mm at the center of the filter, corresponding to $\Delta f=50$ GHz. This is identical to the frequency spacing of the industry standard optical channel spacing (ITU grid). Consequently, the same filter can be used for all possible wavelengths used in the optical communication industry without modification of the design. The wedge angle of 10 arcsec produces a 10 GHz shift of the filter transmission peak for every 2 mm linear displacement of the light input position. Accordingly, in this example of the embodiment, the linear spacing between each of the three samples of the data-encoded optical pulse train TX is 2 mm. As an added benefit of this system 300, it is realized that the wedged etalon filter 316 can also function as a wavelength locker. More specifically, since the etalon 316 was specifically fabricated for filtering frequencies on the ITU grid, the output intensity from the second plane 504 at the center frequency point can be monitored so as to confirm that the DFB output wavelength is that which is expected for the system.

The modulation sidebands are analyzed (i.e., amount of power in each sideband is examined) by a spectral analyzer 318 to determine the extent of misalignment and generate correction signals accordingly. The spectral analyzer 318 contains, among other components, a first detector $322_1$ and a second detector $322_2$. The first detector $322_1$ analyzes the strength of the lower sideband and the second detector $322_2$ analyzes the strength of the upper sideband of the output data-encoded optical pulse train TX. In one example of the subject invention, the first and second detectors $322_1$ and $322_2$, respectively, are P-I-N diodes that are used to detect the intensity of the lower and upper sidebands, respectively. The diodes convert the optical intensity into a lower sideband voltage signal (LSBV) and an upper sideband voltage signal (USBV). The LSBV and USBV are provided as inputs into a differential amplifier 324 to produce a differential control signal (DS). The differential control signal DS is a value that is indicative of the difference of the lower sideband and upper sideband modulation intensities. Accordingly, the greater the intensity difference between the lower and upper sidebands, the greater the relative shifting of the PCM optical pulse train from the center of the electrical data pulses in the EAM 306; hence, the larger the differential control signal DS.

Figure 1:
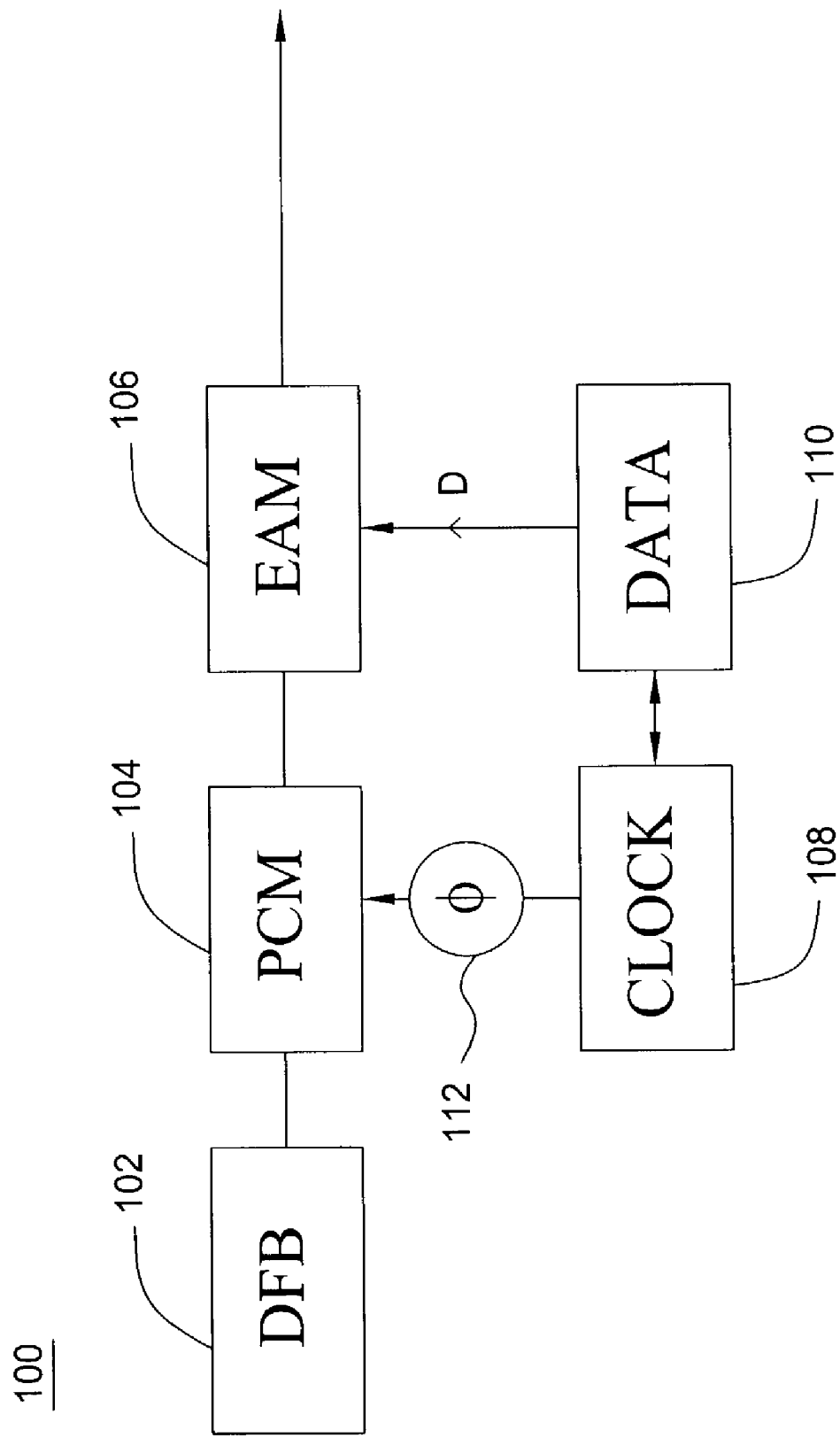
FIG. 1 depicts a prior art optical transmitter for optical communication.
Figure 2:
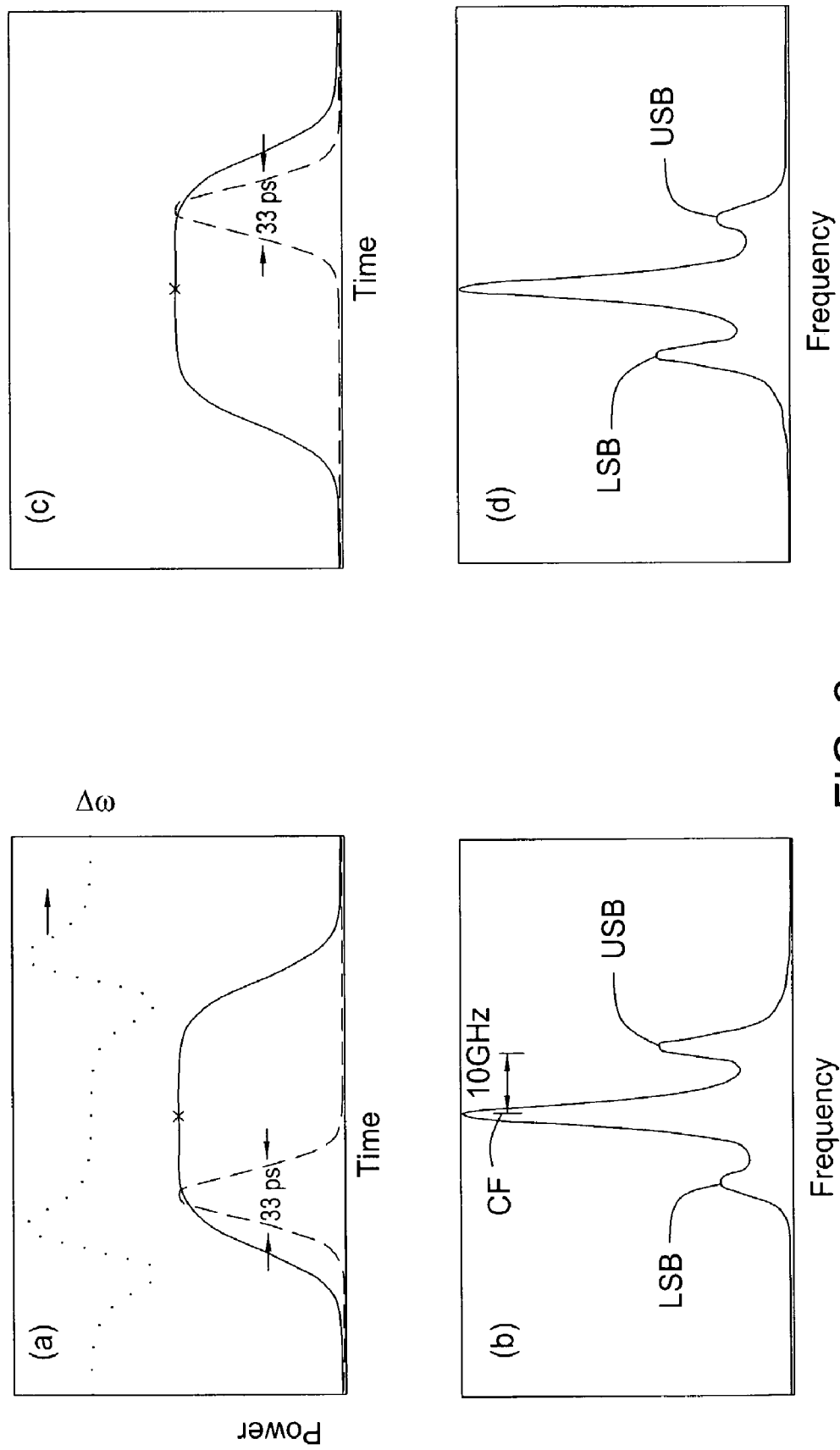
FIG. 2 depicts instances of temporal misalignment between the pulse carver and data modulation in FIG. 1 and the spectral consequences of such misalignments.

The differential control signal DS is provided as input to a phase shifter 326. The phase shifter 326 also receives as input, output signals from the electronic clock 312. As such, the phase shifter 326 can adjust the temporal phase of the incoming clock signal information based upon the differential control signal DS thereby providing a temporal delay to the drive signal of PCM 304. As a result, the optical carrier pulse train from PCM 304 is shifted in time relative to the data modulation pulses applied to the EAM. For example, in a situation such as that shown in FIG. 2A (where the optical pulse leads the data pulse), the differential control signal DS will be such that the resultant timing control signals outputted from the phase shifter 326 brings the optical pulse closer to the center of the data pulses ("x" in FIG. 2A). Similarly, in a condition where the optical pulse lags the data pulse, the differential control signal DS will be such that the resultant timing control signals from the phase shifter 326 centers the optical pulses with respect to the data pulses.

Figure 6:
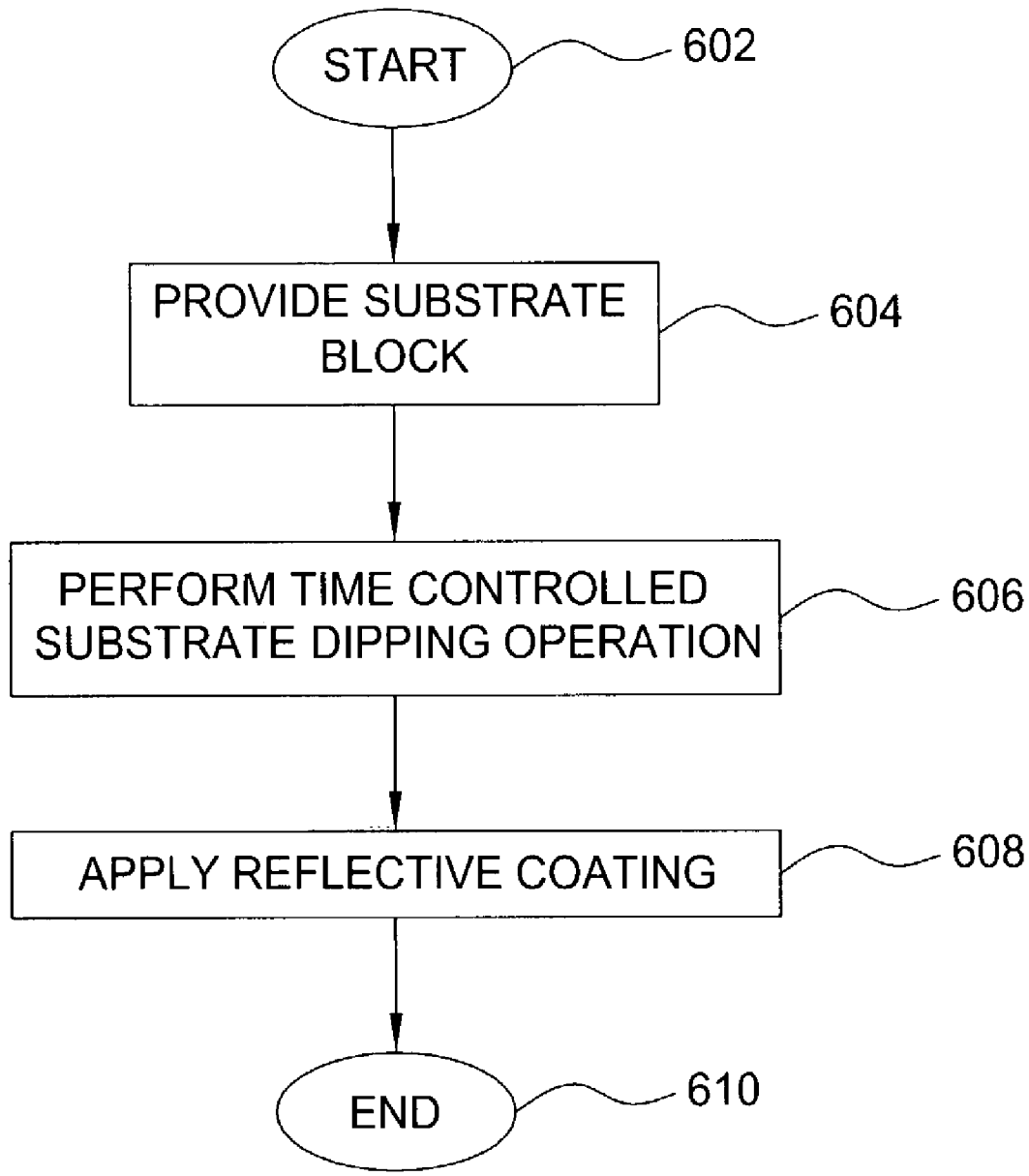
FIG. 6 depicts a series of method steps in accordance with a method of the subject invention for fabricating the filter element.

A method for producing the wedged etalon filter 316 is shown as a series of method steps 600 of FIG. 6. Specifically, the method 600 starts at step 602 and proceeds to step 604 where a fused silica substrate block is provided for further processing. The initial substrate is slightly thicker than the target thickness to account for the material loss owing to the etching process to be detailed. Other materials, including silicon, can also be used. At step 606, the substrate is dipped into an etching solution in a time-controlled manner so as to reduce the thickness of the substrate in a graduated, linear manner. In one particular example, the substrate is silica and is dipped in an HF buffer solution of approximate concentration of 7% at an immersion rate of approximately 3 mm/min. As a result of this time-controlled dipping operation, the block substrate is altered so that two previously parallel planes (e.g., first plane 502 and pre-second plane 504*a*) are now at an angle of 10 arcsec with respect to each other. At step 608, a reflective coating is applied to first plane 502 and second plane 504. In particular, and in a specific example, the reflective coating is approximately 80% and the resultant spectral resolution of the filter is 2 GHz, suitable for separating the modulation side bands at ±10 GHz. The method ends at step 610 with the completed etalon filter 316. One skilled in the art will realize that different angles and thicknesses of a given dispersion element can be formed depending upon system requirements and index of refraction of the initial substrate.

Figure 7:
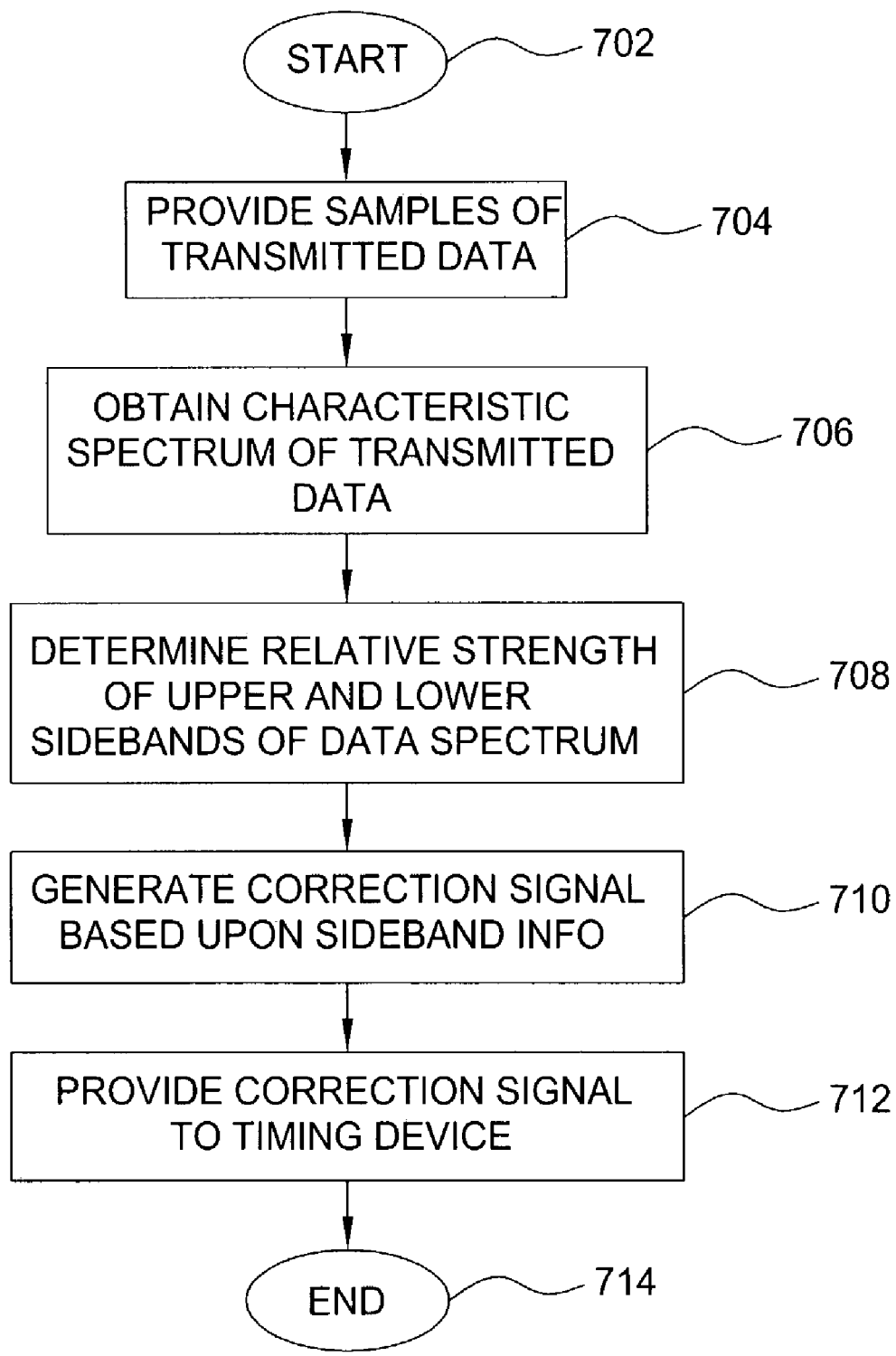
FIG. 7 depicts a series of method steps in accordance with the subject invention for synchronization of a pulse carver and a data modulator.

A method for synchronizing the PCM 304 and the EAM 306 is also disclosed in the subject invention and is specifically shown by the series of method steps 700 of FIG. 7. Specifically, the method starts at step 702 and proceeds to step 704 wherein samples of the data bearing optical pulse train are provided for further inspection and analysis. In one embodiment of the invention, three samples of the optical data are provided. At step 706, the output spectral characteristics of the optical data pulses are obtained. The output spectrum of the optical data is obtained by, for example, a specially designed etalon, which is capable of filtering the operating frequency of the optical element (laser) and also separating the first order upper and lower sidebands.

At step 708, the relative strength of the upper and lower sidebands of the output spectrum are determined. In one example, the relative strength of the upper and lower sidebands is determined by converting the output intensity of these frequencies into electrical signals. At step 710, a correction signal is generated based upon the sideband information obtained from the determining step 708. In one example, the electrical signals obtained by converting the intensity of the upper and lower sidebands are used as inputs to a differential amplifier to generate an output amplifier signal. At step 712, the correction signal is provided to a timing device. In one example of the invention, the output signal generated by the operational amplifier is provided to a RF phase shifter in the system. The phase shifter device alters the timing of the generation of the optical pulse train in the PCM with respect to data pulses so as to center the optical pulses with respect to the data pulses. Successful centering the optical pulses with respect to the data pulses is observed by subsequent monitoring of the upper and lower sidebands of subsequent output data spectrums and observing smaller and smaller correction signals (eventually resulted in a zero value correction signal). The method ends at step 714.

Figure 8:
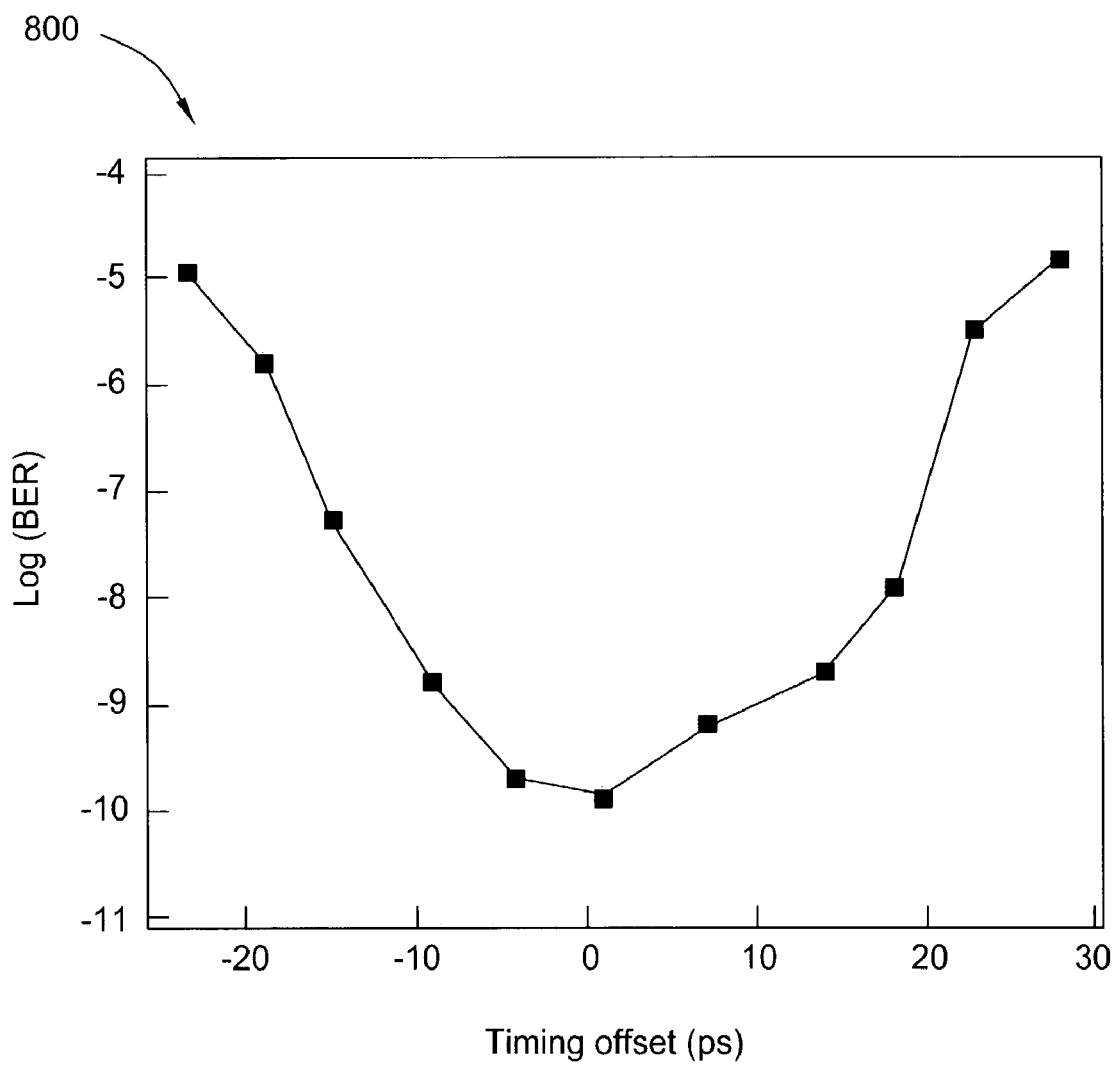
FIG. 8 depicts a graph of timing offset versus bit error rate, which plots specific results of an experiment conducted with the system of the subject invention.

In support of the concepts and specific embodiments described herein, an experiment was performed to assess the validity of the subject invention. Specifically, a 64-channel, 10-Gb/s ULH system having the design, construction and operation as described herein was operated under the conditions presented herein. Additionally, the bit-error rate of one of the channels having a transmission path of over 5,000 kilometers was monitored. The result of the experiment are shown in FIG. 8 as depicted by a graph 800. Specifically, the graph depicts timing offset (in picoseconds) versus the bit error rate (in logarithmic scale). For the desired application of the subject system, it is generally acknowledged that a bit error rate less than $10^{-9}$ is within the accepted bit error rate for transmitting optical signals. Inspection of graph 800 readily indicates that such a bit error rate is easily maintained provided that the timing offset between the PCM and the EAM is kept within a 10 picosecond band around a center point (representing the perfect alignment of the two modulators).

Although various embodiments that incorporate the teachings of the present invention have been shown and described in detail herein, those skilled in the art can readily devise many other varied embodiments that still incorporate these teachings.

We claim:

1. Apparatus, comprising:
a first modulator, for generating a train of optical pulses;
a second modulator, for encoding data to produce a data-encoded optical signal;
a filter, for passing pre-determined spectral regions of said data-encoded optical signal, said spectral regions including upper and lower sideband regions associated with a center frequency of said data-encoded optical signal; and
an analyzer, for determining at least a relative power level of each of said upper and lower sideband regions and producing therefrom a control signal;
said first modulator, in response to said control signal, adjusting said sequence of optical pulses to reduce differences between the relative power levels of said upper and lower sideband regions.

2. The apparatus of claim 1 wherein the first modulator is a lithium niobate pulse carver.

3. The apparatus of claim 1 further comprising a splitter, for splitting said data-encoded optical signal into a plurality of optical signal portions.

4. The apparatus of claim 3, wherein:
said filter comprises a wedged etalon.

5. The apparatus of claim 4, wherein:
said wedged etalon receives the plurality of optical signal portions at a first plane and provides a plurality of filtered optical signal portions at a second plane, said first and second planes exhibiting an angle adapted to pass said pre-determined spectral regions of said data-encoded optical signal.

6. The apparatus of claim 5 wherein the angle between the first plane and the second plane is approximately 10 arcsec.

7. The apparatus of claim 4 wherein the wedged etalon is tuned to an output spectrum centered on a center frequency of the data-encoded optical signal.

8. The apparatus of claim 4 wherein the wedged etalon provides an output spectrum including a center frequency and first order sidebands of the data-encoded optical signal.

9. The apparatus of claim 4 wherein the wedged etalon is a silica based substrate.

10. The apparatus of claim 1 wherein the second modulator is an electroabsorption modulator.

11. The apparatus of claim 1 wherein the analyzer further comprises detection elements for detecting intensity of the pre-determined spectral regions of data-encoded optical signal passed by the filter.

12. The apparatus of claim 11 wherein the detection elements are first and second diodes.

13. The apparatus of claim 12 wherein the diodes detect the intensity of the first order upper and lower sidebands of the spectral regions.

14. The apparatus of claim 1 wherein the control signal is generated by an operational amplifier.

15. The apparatus of claim 14 wherein the operational amplifier receives input voltage signals that are indicative of the output intensity of upper and lower sidebands.

16. The apparatus of claim 1 further comprising a phase shifter connected between the first modulator and the analyzer.

17. The apparatus of claim 16 wherein the phase shifter receives phase shifting information in the form of the control signal.

18. A method, comprising:
determining at least a relative signal strength of upper and lower modulation sidebands of a data-encoded optical signal having associated with it data pulses and optical signal carrier pulses; and
generating a control signal indicative of said determined relative signal strength, controlling said optical signal carrier pulses with respect to said data pulses to reduce differences between said signal strength of said upper and lower modulation sidebands.

19. The method of claim 18, wherein said step of determining comprises:
splitting said data-encoded optical signal into a plurality of data-encoded optical signal portions;
passing at least two of said data-encoded optical signal portions through a filter element to produce filtered optical signal portions having respective center frequencies offset from an initial center frequency of a predetermined amount; and
detecting a power level of each of said at least two filtered optical signal portions.

20. The method of claim 19, wherein said filter element comprises a wedged etalon.

21. The method of claim 18 wherein said step of generating comprises:
converting the determined relative signal strength of the upper and lower modulation sidebands into electrical signals, said electrical signals provided as differential inputs into an operational amplifier which outputs the control signal.

22. The method of claim 18 further comprising applying said control signal to a shifting device for adjusting a temporal phase of the optical signal carrier pulses.

23. The method of claim 22 wherein the adjustment of the temporal phase of the optical signal carrier pulses is performed so that a resultant optical signal carrier pulse is centered with respect to the center of the corresponding data pulse.

24. A method, comprising:
providing a data bearing optical signal in response to a sequence of optical signal carrier pulses and data pulses;
determining at least a relative signal strength of upper and lower modulation sidebands associated with the data bearing optical signal; and
in response to said determined relative signal strength, adjusting said sequence of optical signal carrier pulses to reduce differences between said signal strength of said upper and lower modulation sidebands.

25. The method of claim 24, wherein said step of determining comprises:
  splitting said data bearing optical signal into a plurality of optical signal portions;
  passing at least two of said optical signal portions through a filter element to produce filtered optical signal portions having respective center frequencies offset from an initial center frequency of a predetermined amount; and
  detecting a power level of each of said at least two filtered optical signal portions.

26. The method of claim 25, wherein said filter element comprises a wedged etalon.

27. The method of claim 25 further comprising converting the detected power level of each of said at least two filtered optical signal portions into electrical signals, said electrical signals provided as differential inputs into an operational amplifier which outputs a control signal indicative of the amount of optical signal carrier pulse sequence adapting is to be performed.

28. The method of claim 24 wherein said adapting step comprises applying a control signal to a shifting device for adjusting a temporal phase of the optical signal carrier pulses, said control signal being indicative of the differences in signal strength between the lower and upper modulation sidebands.

29. The method of claim 28 wherein the adjustment of the temporal phase of the optical signal carrier pulses is performed so that the resultant optical signal carrier pulse is centered with respect to the center of the corresponding data pulse.

* * * * *